(12) United States Patent
Radha et al.

(10) Patent No.: US 6,700,893 B1
(45) Date of Patent: Mar. 2, 2004

(54) SYSTEM AND METHOD FOR CONTROLLING THE DELAY BUDGET OF A DECODER BUFFER IN A STREAMING DATA RECEIVER

(75) Inventors: Hayder Radha, Mahwah, NJ (US); Dmitri Loguinov, Wappingers Falls, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/440,622

(22) Filed: Nov. 15, 1999

(51) Int. Cl.$^7$ .......................... H04L 12/56; H04L 1/00; G06F 11/00; G08C 25/02
(52) U.S. Cl. ..................... 370/412; 370/252; 714/748
(58) Field of Search ................... 370/230, 235, 370/236, 237, 252, 253, 412, 428, 429, 465, 468; 709/223, 224, 225, 238; 714/748, 749

(56) References Cited

U.S. PATENT DOCUMENTS

| | | | |
|---|---|---|---|
| 5,553,083 A | | 9/1996 | Miller .......................... 371/32 |
| 5,815,667 A | * | 9/1998 | Chien et al. .................. 709/232 |
| 5,870,412 A | | 2/1999 | Schuster et al. ........... 371/37.01 |
| 5,892,754 A | * | 4/1999 | Kompella et al. ............ 370/236 |
| 6,031,818 A | * | 2/2000 | Lo et al. ....................... 370/216 |
| 6,275,471 B1 | * | 8/2001 | Bushmitch et al. .......... 370/248 |

FOREIGN PATENT DOCUMENTS

| | | | |
|---|---|---|---|
| EP | 0808048 A2 | 5/1997 | ............ H04L/29/06 |
| EP | 0836300 A2 | 7/1997 | ............ H04L/12/56 |
| EP | 0808048 A2 | 11/1997 | |
| EP | 0836300 A2 | 4/1998 | |
| EP | 0884873 A2 | 5/1998 | ............ H04L/12/46 |
| EP | 0915598 A2 | 9/1998 | ............ H04L/29/06 |
| EP | 0884873 A2 | 12/1998 | |
| EP | 0915598 A2 | 5/1999 | |
| JP | 10257079 A | 9/1998 | |
| WO | WO9429979 | 6/1994 | ............ H04J/3/26 |
| WO | WO9429979 | 12/1994 | |

OTHER PUBLICATIONS

Patent Abstracts of Japan; "Node Device, Communication System Packet Transmission Control Method and Packet Transmission Method", Toshiba Corp. 10257079A.

* cited by examiner

*Primary Examiner*—Ricky Ngo
*Assistant Examiner*—Michael E. Robustelli
(74) *Attorney, Agent, or Firm*—Russell Gross

(57) ABSTRACT

There is disclosed a delay budget controller for use with a decoder buffer that receives streaming data packets over a data network from a streaming transmitter and stores the data packets in a plurality of access units for subsequent retrieval by a streaming data decoder. The delay budget controller comprises 1) a first controller for monitoring at least one network parameter associated with the data network; and 2) a second controller for monitoring in the decoder buffer a delay budget region comprising a sequence of access units that are about to be accessed sequentially by the data decoder. The delay budget region comprises a retransmission region and a late region separated by a temporal boundary, wherein the second controller detects missing data packets in the retransmission region and the late region and, in response to detection of a missing data packet in the retransmission region, transmits a retransmission request for the missing data packet to the streaming transmitter. The second controller adjusts the temporal boundary to thereby advance or retard the transmission of the retransmission request.

32 Claims, 4 Drawing Sheets

SYSTEM AND METHOD FOR CONTROLLING THE DELAY BUDGET OF A DECODER BUFFER IN A STREAMING DATA RECEIVER

CROSS-REFERENCE TO RELATED APPLICATIONS

The present invention is related to that disclosed in U.S. patent application Ser. No. 09/365,463, entitled "DECODER BUFFER FOR STREAMING VIDEO RECEIVER AND METHOD OF OPERATION," filed on Aug. 2, 1999. The foregoing application is commonly assigned to the assignee of the present invention. The disclosures of the related patent application is hereby incorporated by reference for all purposes as if fully set forth herein.

TECHNICAL FIELD OF THE INVENTION

The present invention is directed, in general, to data streaming systems and, more specifically, to a decoder buffer for use in a streaming data receiver, such as a streaming video receiver.

BACKGROUND OF THE INVENTION

Real-time streaming of data, such as multimedia content, over Internet protocol (IP) networks has become an increasingly common application in recent years. A wide range of interactive and non-interactive multimedia Internet applications, such as news on-demand, live TV viewing, video conferencing, and many others, rely on end-to-end streaming solutions. Unlike a "downloaded" audio or video file, which may be retrieved first in "non-real" time and viewed or played back later, streaming audio and streaming video applications require an audio source or video source to encode and to transmit an audio signal or video signal over a network to an audio receiver or a video receiver, which must decode and display (or play back) the transmitted signal in real time. The receiver relies on a decoder buffer to receive encoded video data packets and/or encoded audio data packets from the network and to transfer the packets to a video decoder and/or an audio decoder.

Two problems arise when a streaming data signal is transmitted across a non-guaranteed Quality-of-Service (QoS) network, such as the Internet. First, end-to-end variations in the network (e.g., delay jitter) between the streaming data transmitter and the streaming data receiver mean that the end-to-end delay is not constant. Second, there is usually a significant packet loss rate across non-QoS networks, often requiring re-transmission. The lost data packet must be recovered prior to the time the corresponding frame must be decoded. If not, an underflow event occurs. Furthermore, if prediction-based compression is used, an underflow due to lost data packets may not only impact the current frame being processed, but may affect many subsequent frames.

It is well-known that re-transmission of lost packets is a viable means of recovery for continuous media communication over packet networks. Many applications use a negative automatic repeat request (NACK) in conjunction with re-transmission of the lost packet. These approaches take into consideration both the round-trip delay and the delay jitter between the sender and the receiver(s).

For example, an end-to-end model with re-transmission for packet voice transmission has been developed. This model takes advantage of the fact that voice data consists of periods of silence separated by brief talk-spurt segments. The model also assumes that each talk-spurt consists of a fixed number of fixed-size packets. However, this model is not general enough to capture the characteristics of compressed video or audio (which can have variable number of bytes or packets per video or audio frame). Additionally, an adaptive playback algorithm has been developed that changes the playback time of a video frame in response to network conditions. This results in a time-varying playback rate (i.e., introduces "playback jitter") in response to network jitter and packet losses.

The above mentioned solutions can be applicable for voice data or for certain video applications which tolerate "playback jitter." However, these solutions may not be acceptable for many types of video-on-demand services (e.g., entertainment applications). In addition, while maintaining continuous decoding and displaying of the real-time audio/visual data, it is crucial for the selected packet loss recovery mechanism to modify its operation according to changing conditions during the Internet session in which the data is transmitted.

Any packet retransmission scheme must strike a balance in determining when to request retransmission of a late data packet. If a streaming data receiver waits too long before requesting retransmission of a late (and possibly lost) data packet, the requested data packet may not be received when needed, due to the round trip delay associated with the retransmission request and retransmission of the late data packet. However, if the streaming data receiver waits only a very brief period before requesting retransmission of a late (but not lost) data packet, an excessive amount of the limited bandwidth available between the streaming data transmitter and the streaming data receiver will be consumed by the increased number of unnecessary retransmission requests and the increased number of duplicate packet transmissions.

There is therefore a need in the art for improved streaming data receivers that compensate for variations inherent in a non-QoS network. In particular, there is a need for an improved receiver decoder buffer that takes into consideration both transport delay parameters (e.g., end-to-end delay and delay jitter) and video. (or audio) encoder buffer constraints. More particularly, there is a need for an improved decoder buffer that implements a packet loss recovery mechanism that modifies its operation according to changing conditions of the data network over which the streaming data is transmitted and minimizes the number of duplicate data packet transmissions.

SUMMARY OF THE INVENTION

The present invention is embodied in an Integrated Transport Decoder (ITD) buffer model. One key advantage of the ITD model is that it eliminates the separation of a network-transport buffer, which is typically used for removing delay jitter and recovering lost data, from the video/audio decoder buffer. This can significantly reduce the end-to-end delay, and optimize the usage of receiver resources (such as memory).

The present invention provides a re-transmission framework that uses a time-delay budget constraint for streaming video receiver during a real-time Internet session. In other words, at the beginning of the session, the streaming data receiver introduces a certain start-up delay to the incoming bitstream. This start-up delay defines the time-delay budget that the streaming data receiver can rely on for packet loss recovery for the remainder of the session. The re-transmission framework manages this time-delay budget in an adaptive manner in response to changing network conditions. The present invention maximizes the time for uninterrupted decoding and presentation of the multimedia content while minimizing time for duplicate-packet transfer events. These duplicate-packet transfer events occur when the streaming data receiver requests the re-transmission of packets prematurely, reducing the effective available bandwidth between the streaming data transmitter and the streaming data receiver.

It is a primary object of the present invention to provide a delay budget controller for use with a decoder buffer capable of receiving streaming data packets over a data network from a streaming transmitter and storing the data packets in a plurality of access units for subsequent retrieval by a streaming data decoder. In an advantageous embodiment, the delay budget controller comprises 1) a first controller capable of monitoring at least one network parameter associated with the data network; and 2) a second controller capable of monitoring in the decoder buffer a delay budget region comprising a sequence of access units that are about to be accessed sequentially by the data decoder, the delay budget region comprising a retransmission region and a late region separated by a temporal boundary, wherein the second controller detects missing data packets in the retransmission region and the late region and, in response to detection of a missing data packet in the retransmission region, transmits a retransmission request for the missing data packet to the streaming transmitter, and wherein the second controller is capable of adjusting the temporal boundary to thereby advance or retard the transmission of the retransmission request.

In one embodiment of the present invention, the second controller adjusts the temporal boundary in response to a measured value of the at least one network parameter.

In another embodiment of the present invention, the at least one network parameter comprises a round trip delay period associated with the retransmission request.

In still another embodiment of the present invention, the at least one network parameter comprises a delay jitter associated with a variation in the round trip delay period.

In yet another embodiment of the present invention, the at least one network parameter comprises an available bandwidth value associated with a communication channel between the streaming data transmitter and the decoder buffer.

In a further embodiment of the present invention, the first and second controllers are capable of determining a probability that a packet that is identified as lost by the first and second controllers is actually lost.

In a still further embodiment of the present invention, the second controller adjusts the temporal boundary in response to a value of the probability.

In a yet further embodiment of the present invention, the first controller is capable of adjusting a second temporal boundary associated with the delay budget region to thereby increase or decrease a duration of the delay budget region.

Those skilled in the art will readily understand that while the embodiment of the present invention described in the DETAILED DESCRIPTION OF THE INVENTION that follows is principally oriented towards streaming video (or audio), this is by way of illustration only. More broadly speaking, the improved integrated transport decoder buffer described below may be readily adapted for use in connection with any type of streaming data, including video data and audio data, that must be supplied to a decoder at a required rate.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof., mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OR THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged streaming video receiver.

Additionally, those skilled in the art will readily understand that while the embodiment of the present invention described below is principally oriented towards streaming video, this is by way of illustration only. In fact, the improved integrated transport decoder buffer described below may be readily adapted for use in connection with streaming audio data or other streaming data that must be supplied to a decoder at a required rate.

Figure 1:
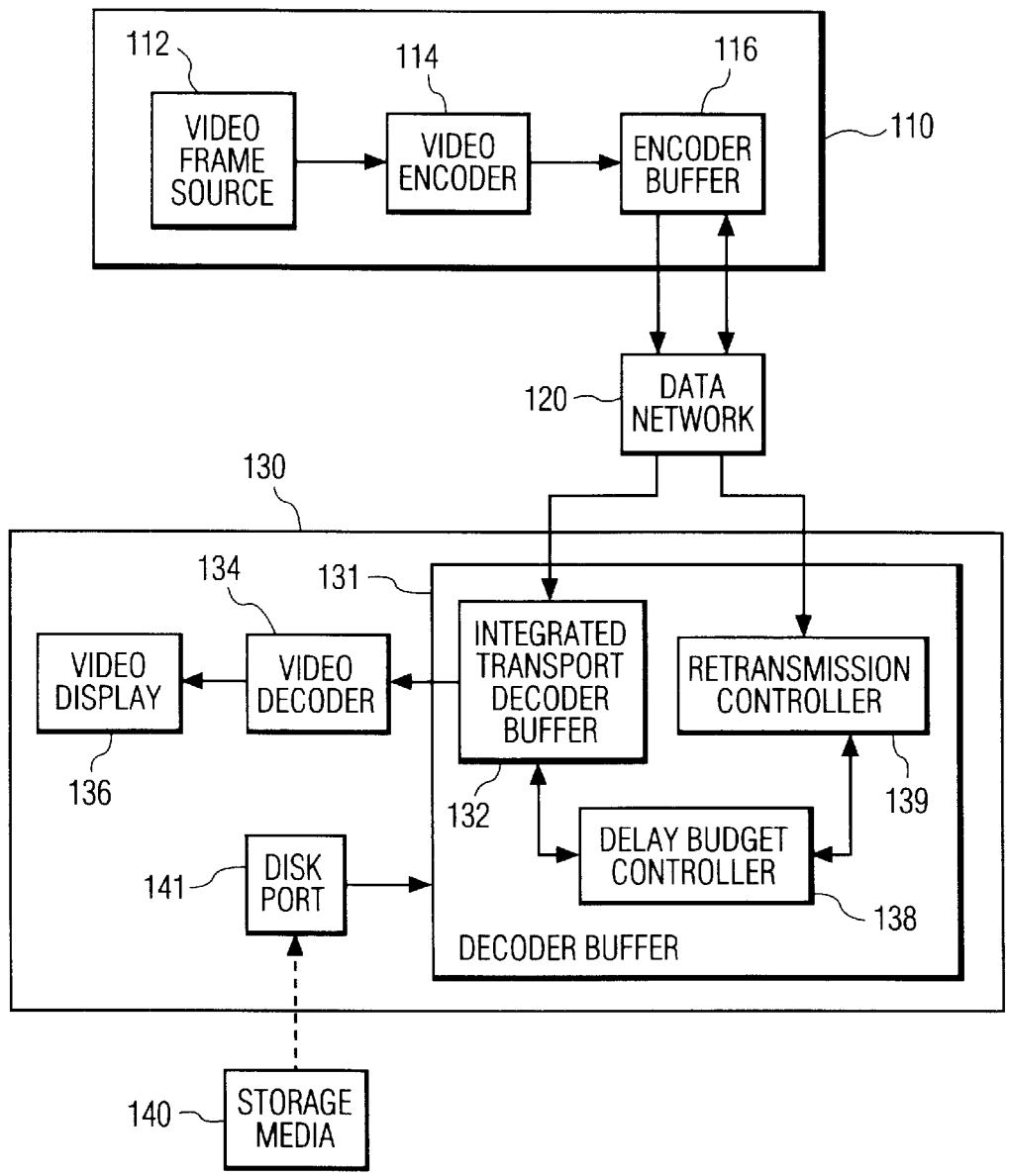
FIG. 1 illustrates an end-to-end transmission of streaming video from a streaming video transmitter through a data network to an exemplary streaming video receiver according to one embodiment of the present invention.

FIG. 1 illustrates an end-to-end transmission of streaming video from streaming video transmitter 110 through data network 120 to at least one streaming video receiver 130, according to one embodiment of the present invention. Other streaming video receivers similar to streaming video receiver 130 may also be coupled to streaming video transmitter 110 via data network 120. In order to avoid redundant description, however, these other streaming video receivers are not shown or explained.

Depending on the application, streaming video transmitter 110 may be any one of a wide variety of sources of video frames, including a data network server, a television station, a cable network, a desktop personal computer (PC), or the like. Streaming video transmitter 110 comprises video frame source 112, video encoder 114 and encoder buffer 116. Video frame source 112 may be any device capable of generating a sequence of uncompressed video frames, including a television antenna and receiver unit, a video cassette player, a video camera, a disk storage device capable of storing a "raw" video clip, and the like.

The uncompressed video frames enter video encoder 114 at a given picture rate (or "streaming rate") and are compressed according to any known compression algorithm or device, such as an MPEG-4 encoder. Video encoder 114 then transmits the compressed video frames to encoder buffer 116 for buffering in preparation for transmission across data network 120. Data network 120 may be any suitable IP network and may include portions of both public data networks, such as the Internet, and private data networks, such as an enterprise-owned local area network (LAN) or wide area network (WAN).

Streaming video receiver 130 comprises decoder buffer 131, video decoder 134 and video display 136. Decoder buffer 131 receives and stores streaming compressed video frames from data network 120. Decoder buffer 131 then transmits the compressed video frames to video decoder 134 as required. Video decoder 134 decompresses the video frames at the same rate (ideally) at which the video frames were compressed by video encoder. 114.

Decoder buffer 131 further comprises integrated transport decoder (ITD) buffer 132, delay budget controller 138 and re-transmission controller 139. In accordance with the principles of the present invention, ITD buffer 132 integrates both temporal and data-unit occupancy considerations in order to provide video decoder 134 with compressed video frames at a rate that is sufficient to avoid underflow conditions, during which video decoder 134 is starved for compressed video frames.

ITD buffer 132 accomplishes this in cooperation with delay budget controller 138 and re-transmission controller 139. Delay budget controller 138 monitors the level of data-occupancy in ITD buffer 132 and detects missing data packets and potential underflow conditions. In response to notification from delay budget controller 138, re-transmission controller 139 requests re-transmission of data missing from ITD buffer 132 in order to avoid underflow conditions.

In an advantageous embodiment of the present invention, ITD buffer 132, delay budget controller 138, and re-transmission controller 139 are implemented in a personal computer (PC) that receives streaming video and/or audio from, for example, the Internet over a high-speed data line. In such an embodiment, ITD buffer 132 may be implemented in main random access memory (RAM) of the PC or in RAM on a video card, and delay budget controller 138 and re-transmission controller 139 may be implemented in the CPU of the PC. To implement delay budget controller 138 in a PC environment, the present invention may be embodied as computer executable instructions stored as a program on storage media 140. Storage media 140 may be a CD-ROM, a computer diskette, or a similar device that may be loaded into removable disk port 141 in streaming video receiver 130.

Continuous decoding of compressed video frames is a key requirement of a real-time multimedia application, such as streaming video. To meet this requirement, a decoder-encoder buffer model is normally used to ensure that underflow and overflow events do not occur. These constraints limit the size (bit-wise) of video pictures that enter the encoder buffer. The constraints are usually expressed in terms of encoder-buffer bounds, which when adhered to by the encoder, guarantee continuous decoding and presentation of the compressed video stream at the receiver.

Figure 2:
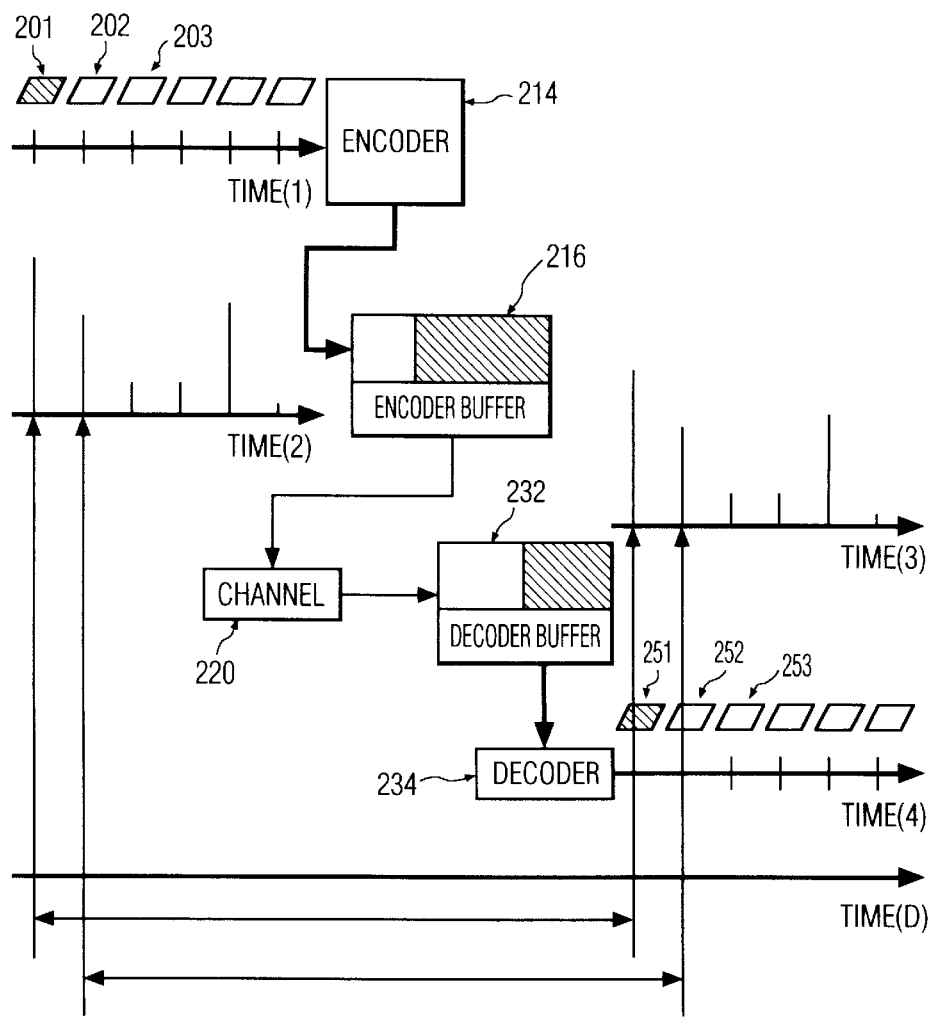
FIG. 2 illustrates an ideal encoder-decoder model of a video coding system.

FIG. 2 shows an ideal encoder-decoder model of a video coding system. Under this ideal model, uncompressed video frames 201–203 enter the compression engine of encoder 214 at a given picture-rate, X frames/second, as indicated by the Time(1) line. The compressed frames exit encoder 214 and enter encoder buffer 216 at the same X frames/second, as indicated by the Time(2) line. Similarly, the compressed frames exit decoder buffer 216 and enter channel 220 at X frames/second. Channel 220 is a generic representation of any transmission medium, such as the Internet, that transfers compressed video frames from a transmitting source to a receiver. In the ideal case, the delay of channel 220 ($\delta_c$) is a constant value.

Next, the compressed frames exit channel 220 and enter decoder buffer 232 at the same X frames/second as at the input and the output of encoder 214, as indicated by the Time(3) line. Decoder buffer 232 transmits the compressed frames to decoder 234, which decompresses the frames and outputs decompressed frames 251–253 at the original X frames/second at which frames entered encoder 214.

Ideally, the end-to-end buffering delay (i.e., the total delay encountered in both encoder buffer 216 and decoder buffer 232) is constant. However, the same piece of compressed video data (e.g., a particular byte of the video stream) encounters different delays in encoder buffer 216 and decoder buffer 232. In the ideal model, encoding in encoder 214 and decoding in decoder 234 are instantaneous and require zero execution time and data packets are not lost.

The encoder buffer bounds can be expressed using discrete-time summation. In discrete-time domain analysis, $\Delta$ is the end-to-end delay (i.e., including both encoder buffer 216 and decoder buffer 232 and channel delay $\delta_c$) in units of time. For a given video coding system, $\delta$ is a constant number applicable to all frames entering the encoder-decoder buffer model.

To simplify the discrete-time analysis, it is assumed that the end-to-end buffering delay ($\Delta T=\Delta-\delta_c$) is an integer-multiple of the frame duration (T). Therefore, $N\Delta=N(\Delta-\delta_c)/T$ represents the delay of the encoder and decoder buffers in terms of the number of video frames (N). For the purposes of clarity and brevity in describing the principles of the present invention, the remainder of this disclosure will use time units specified in frame-duration intervals. For example, using the encoder time reference shown in FIG. 2, the $n^{th}$ frame enters encoder buffer 216 at time index "n". The decoder time-reference of decoder buffer 232 is shifted by the channel delay ($\delta_c$), with respect to encoder buffer 216.

The data rate (r) at the output of encoder (e) 214 during frame-interval "i" may be represented as $r^e(i)$. Here, "data rate" is used generically. It could signify bit rate, byte rate, or even packet rate. Similarly, the data rate at the input of decoder buffer 232 may be represented as $r^d(i)$. Based on the ideal model, $r^e(iT)=r^d(iT+\square_c)$. In addition, based on the convention established above, $r^e(i)=r^d(i)$. Thus, the bounds of encoder buffer 216 can be expressed as:

$$\max\left[\left(\sum_{j=n+1}^{n+\Delta N} r^e(j) - B_{\max}^d\right), 0\right] \leq$$ [EQUATION 1]

$$B^e(n) \leq \min\left[\left(\sum_{j=n+1}^{n+\Delta N} r^e(j)\right), B_{\max}^e\right]$$

where $B_{max}^d$ and $B_{max}^e$ are the maximum decoder and encoder buffer sizes respectively.

In the ideal case, it is assumed that encoder 214 begins to transmit data immediately after the first frame enters encoder 214. Therefore, the start-up delay $dd_f$ (i.e., the delay time the first piece of data from the first picture spends in decoder buffer 232 prior to decoding) equals the end-to-end, encoder-decoder buffer delay: $dd_f=\Delta T=T\cdot\Delta N$.

In one embodiment of the present invention, ITD buffer 132 minimizes underflow events by taking into consideration the above-described problems of the ideal buffer model and the ideal encoder-decoder buffer constraints. ITD buffer 132 is based on lost packet recovery using re-transmission.

Figure 3:
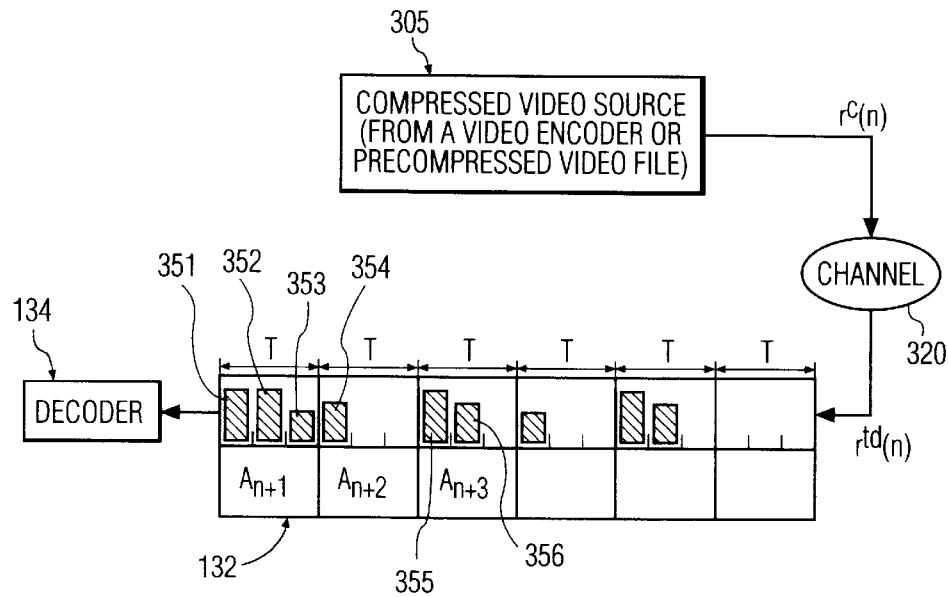
FIG. 3 illustrates end-to-end transmission of streaming video from a compressed video source through a channel to an exemplary integrated transport decoder buffer and video decoder, according to one embodiment of the present invention.

FIG. 3 is a simplified block diagram of exemplary end-to-end transmission of streaming video, without support for re-transmission. For the purposes of simplicity and clarity, streaming video transmitter 110 has been replaced by compressed video source 305 and data network 120 has been replaced by channel 320. Compressed video source 305 transmits data packets at rate $r^e(n)$ and channel 320 transmits data packets at rate $r^{td}(n)$ Since video re-transmission is not discussed in FIG. 3, delay budget controller 138 and re-transmission controller 139 are omitted from the diagram. Streaming video receiver 130 has been simplified and is represented by ITD buffer 132 and video decoder 134.

As noted above, ITD buffer 132 integrates temporal and data-unit occupancy models. ITD buffer 132 is divided into temporal segments of 'T' seconds each. By way of example, the parameter T may be the frame period in a video sequence. The data packets (bits, bytes, or packets) associated with a given duration T are buffered in the corresponding temporal segment. All of the data packets associated with a temporal unit are referred to as an "access" unit. By way of example, data packets 351, 352, and 353 comprise access unit $A_{n+1}$, data packet 354 comprises access unit $A_{n+2}$, and data packets 355 and 356 comprise access unit $A_{n+3}$.

During time interval n, the $n^{th}$ access unit, $A_n$, is being decoded by decoder 134 and access unit $A_{n+1}$ is stored at the temporal segment nearest to the output of ITD buffer 132. An access unit may be an audio frame, a video frame, or even a portion of a video frame, such as Group of Blocks (GOB). Therefore, the duration required to decode or to display an access unit is the same as the duration of the temporal segment T. During the time-interval n, the rate at which data enters ITD buffer 132 is $r^{td}(n)$. The numbers of data packets in each access unit are not required to be the same. Compression algorithms used in video encoder 114 may compress the data packets in successive access units by different amounts, even though each access unit represents temporal units of the same duration.

For example, the three data packets 351–353 in access unit $A_{n+1}$ may comprise a complete video frame, Frame 1. The single data packet 354 in $A_{n+2}$ may represent only those portions of Frame 2 that are different than Frame 1. Nonetheless, data packet 354 is sufficient to create Frame 2 if the Frame 1 data is already known. Since Frame 1 and Frame 2 have the same duration, the temporal segment, T, is the same for $A_{n+1}$ and $A_{n+2}$.

Each temporal segment holds a maximum number of packets, $K_{max}$, with each packet having a maximum size, $b_{max}$, (in bits or bytes). Therefore, the maximum size of an access unit, $S_{max}$, may be represented by $S_{max} \leq K_{max}(b_{max})$. Video encoder 114 is assumed to begin each access-unit with a new packet that is present only in that access unit.

The amount of data in ITD buffer 132 at time index n, $B^{td}(n)$, may be described by terms of $B^a(n)$ and $B^b(n)$. $B^a(n)$ represents the number of consecutive-and-complete access units in ITD buffer 132 at the beginning of interval n, and $B^b(n)$ represents the total consecutive amount of data in ITD buffer 132 at the end of interval n. For $B^a(n)$, temporal segments containing partial data are not counted, and all segments following a partial segment are also not counted even if they contain a complete, access-unit worth of data. Hence, $TB^a(n)$ represents the amount of video data in temporal units (e.g., seconds) that ITD buffer 132 holds at time index n (without running into an underflow if no more data arrives).

If $S_n$ denotes the size of access unit n, the relationship between $B^a$ and $B^b$ can be expressed as Equation 2 below:

$$B^b(n) = \sum_{j=N+1}^{n+B^a(n)} S_j U_{B^a(n)+1}$$ [EQUATION 2]

where $S_j$ is the maximum size of the access unit for temporal segment j and $U_{B^a(n)+1}$ is the partial (incomplete) data of access unit $A_{n+B^a(n)+1}$ stored in temporal segment $B^a(n)+1$ at the beginning of time index n.

In order for re-transmission to occur, ITD buffer 132 must be able: a) to output one temporal segment (T) worth of data at the beginning of every temporal time-interval n; b) to detect lost packet(s) and to transmit corresponding negative acknowledge (NACK) messages to transmitter 110 or compressed video source 305; c) to continuously store newly arrived primary (i.e., not re-transmitted) packets; and d) to store re-transmitted packets. Ideal ITD buffer 132 maintains the data rate of the video stream, without delays caused by re-transmission of any lost data. In other words, if $r^e(n)$ is the transmission data rate used by idealized video encoder 114 under lossless circumstances, ideal ITD buffer 132 will maintain this date rate without degradation caused by the re-transmission process. Depending upon the number of re-transmission requests, encoder buffer 116 may adjust its output data rate $r^e(n)$, with a corresponding adjustment by ITD buffer 132.

In one embodiment, decoder buffer 131 adds buffering for the incoming video stream in order to compensate for the time required for detection and recovery of lost data and for the delay associated with a "real" world implementation. By delaying all incoming video streams by this compensation time, decoder buffer 131 outputs video stream data at a continuous rate as required for decoding. The minimum duration of time needed for detecting a predetermined number of lost packets is represented by $T_L$. In general, $T_L$ is a function of the delay jitter caused by data arriving later than expected by ITD buffer 132.

The minimum amount of time needed for streaming video receiver 130 to recover a packet after being declared lost is represented by $T_R$. Time $T_R$ includes the time required for streaming video receiver 130 to send a NACK to streaming video transmitter 110 and the time needed for the re-transmitted data to reach streaming video receiver 130 (assuming that the NACK and re-transmitted data are not lost).

Exemplary decoder buffer 131 transfers a re-transmitted packet with a minimum delay $(T_L+T_R)$ for the lost packet interval. If the minimum delay experienced by any video data for an ideal decoder buffer 131 is represented by $dd_{min}$, the amount of delay $\Delta_R$ that may be added to the minimum ideal delay in order to account for the total delay for re-transmission is:

$$\Delta_R \geq u(T_L+T_R-dd_{min}) \qquad \text{[EQUATION 3]}$$

where $u(x)=x$ for $x>0$, and $u(x)=0$ for $x \leq 0$.

Decoder buffer 131 adds delay $\Delta_R$ buffering for all output data to video decoder 134 in order to provide time for decoding and transferring of the data, resulting in continuous video streams. Therefore, the total encoder buffer 116 to decoder buffer 132 output delay $(\Delta_{TOT})$ may be represented by:

$$\Delta_{TOT}=\Delta_{ideal}+\Delta_R \geq \Delta_{ideal}+u(T_L+T_R-dd_{min}) \qquad \text{[EQUATION 4]}$$

ITD buffer 132 provides buffering (storage) for a minimum number of temporal segments $(B_{min}{}^a)$ as compensation for re-transmission time requirements and as prevention for an underflow event. The ITD buffer 132 sizing may be based, for example, on minimum and maximum boundaries for storing temporal segments. The process for determining these boundaries was described in U.S. patent application Ser. No. 09/365,463, entitled "DECODER BUFFER FOR STREAMING VIDEO RECEIVER AND METHOD OF OPERATION" and previously incorporated by reference into this disclosure.

Figure 4:
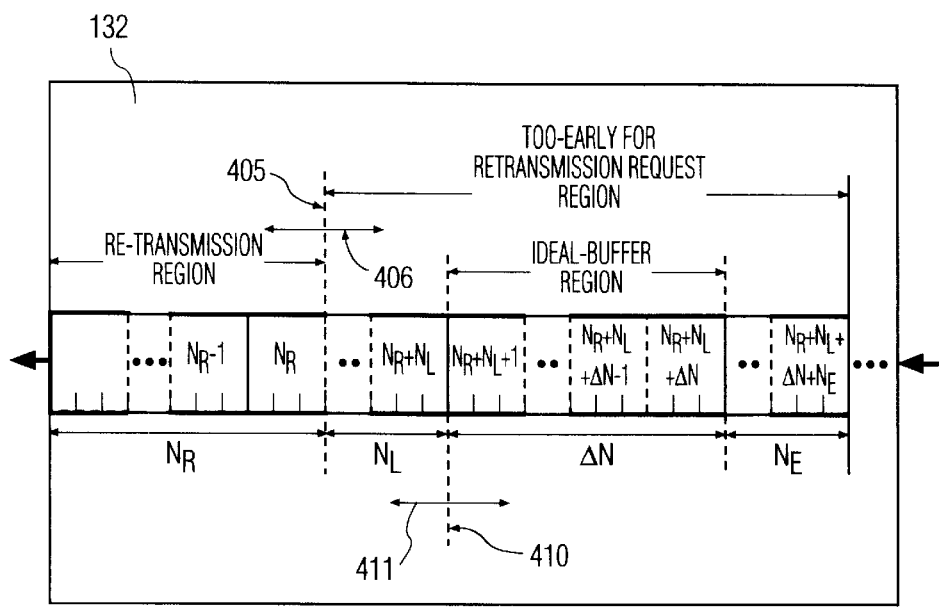
FIG. 4 illustrates a sequence diagram showing the flow of data packets through different and distinct regions of exemplary ideal integrated transport decoder buffer.

FIG. 4 is a sequence diagram showing the flow of data packets through different regions of exemplary ITD buffer 132 under the assumption that $dd_{min}=0$ (the lower boundary level) and $d_{max}=\Delta_{ideal}$. ITD buffer 132 data enters from the right side of the diagram and exits to the video decoder 134 at the left side. The most recently received data is in a buffer area which is labeled "too-early for re-transmission request region" (too-early). Depending on the location in the too-early region of the buffer, ITD buffer 132 introduces buffer delays labeled $N_E$, $\Delta N$, or $N_L$. The area of this too-early buffer region, which comprises the ideal delay $\Delta N$, is labeled as the ideal-buffer region. ITD buffer 132 manages the ideal-buffer region as an ideal video buffer. In other words, data packets flow through this region and are only delayed by the inherent characteristics of the buffer element(s). Ideal ITD buffer 132 provides the remaining too-early buffer areas to compensate for delays associated with the transfer of video streams from streaming video transmitter 110 to decoder 131 ($N_E$), as well as delays caused by delayed or lost video packets ($N_L$).

ITD buffer 132 provides a delay, $N_R$, in the re-transmission region in order to compensate for expected time requirements for the initiation and reception of re-transmission requests. Exemplary decoder buffer 131 initiates re-transmission requests during the time periods associated with the re-transmission region.

It is important to note that the ideal-buffer and re-transmission regions may overlap, depending on the values of the different delay parameters ($dd_{min}$, $T_R$, $T_L$). However, for the exemplary ideal ITD buffer 132 with $dd_{min}=0$, the re-transmission and ideal-buffer regions do not overlap.

For ITD buffer 132, $N_E$ represents the initial decoding delay ($dd_f$) which corresponds to the amount of delay encountered by the very first piece of data that enters the buffer prior to the decoding of the first picture (or access unit). This $dd_f$ is based on, among other things, the streaming video transmitter 110 and data network 120 data transmission rates during elapsed time $dd_f$. In the ideal case, ITD buffer 132 uses this same data rate for entering received data into its buffer (storage) regions. Ideal decoder buffer 131 recognizes the amount of data in its ITD buffer 132 regions just prior to the time that the first access unit is decoded as $B^d_0$ data. The $B^d_0$ data, also referred to as "start-up-delay" data, is given by the following relationship:

$$B^d_0 = \sum_{j=1}^{\Delta N} r^e(j) \qquad \text{[EQUATION 5]}.$$

When $dd_{min}=0$, ideal decoder buffer 131 re-transmission processing is comprised of the following procedures:

1. The ideal-buffer region is filled until all data associated with the start-up delay are in the buffer. Since lost events may also occur during this time interval, these data may be treated in a special way, such as by using reliable transmission (e.g., using TCP) for them. The ideal condition for lossless data is satisfied when:

$$\sum_{k=N_R+N_L+1}^{N_R+N_L+\Delta N} B_k = B^d_0 \qquad \text{[EQUATION 6]}$$

where $B_k$ is the amount of data stored in ideal ITD buffer 132 temporal segment k at any instant of time.

2. After Equation 15 is satisfied, ITD buffer 132 advances the content of all temporal storage segments by one segment toward the buffer output. Subsequently, ideal ITD buffer 132 repeats this process every T units of time. After $N_L+N_R$ periods of T (i.e., after $T_L+T_R$), decoder 134 starts decoding the first access unit. The time-period that starts when decoding of the first access unit begins is labeled $T_1$. Hence, the beginning of any time period n ($T_n$) represents the time when access unit $A_{n+k}$ is moved to temporal segment k.

3. Ideal ITD buffer 132 considers data missing in temporal segment $N_R$ of the re-transmission buffer region as lost. This condition occurs when:

$$B_{N_R}(n) < S_{n+N_R} \qquad \text{[EQUATION 7]}$$

where $B_{N(R)}$ is the amount of data in temporal segment $N_R$ at time period n and $S_j$ is the size of access unit j. When ideal ITD buffer 132 determines that data is missing, it sends a re-transmission request to streaming video transmitter 110.

4. Ideal ITD buffer 132 places arriving re-transmitted data into their corresponding temporal segments of the re-transmission region. Assuming the re-transmitted data are received, ideal ITD buffer 132 transfers the re-transmitted data to the video decoder 134 prior to the decoding times of their corresponding access units.

In order to properly balance the need to request retransmission of late packets in a timely manner with the need to avoid duplicative data packet deliveries, the present invention provides a retransmission framework that uses a time-delay budget constraint for streaming data receivers during real-time Internet sessions. Delay budget controller 138 manages this time-delay budget in an adaptive manner in response to changing network conditions, as described below in greater detail.

Figure 5:
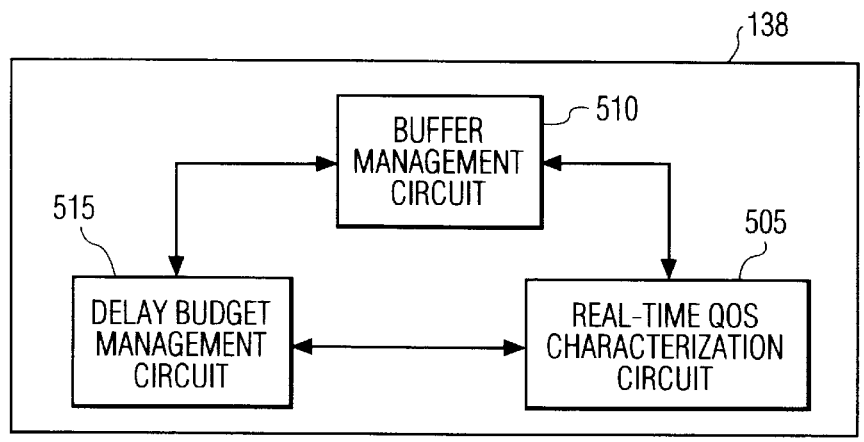
FIG. 5 illustrates an exemplary delay budget controller in accordance with one embodiment of the present invention.

The present invention is primarily receiver-oriented retransmission technique. FIG. 5 illustrates exemplary delay budget controller 138 in accordance with one embodiment of the present invention. Delay budget controller 138 comprises real-time QoS characterization circuit 505, buffer management circuit 510, and delay budget management circuit 515, which coordinate the flow of streaming video between streaming video receiver 130 and streaming video transmitter 110.

In one embodiment of the present, delay budget controller. 138 establishes a delay budget that is static and adapts the sizes of different temporal regions within the static delay budget. In an alternate embodiment of the present invention, delay budget controller 138 may establish a delay budget that is dynamic and may adapt the size of the over all delay budget, as well as adapt the size of the different temporal regions within the dynamic delay budget.

This is illustrated in FIG. 4. The temporal position of one or both of boundary lines 405 and 410 may be adjusted by delay budget controller 138, as indicated by the double arrow lines 406 and 411. In a static mode, delay budget controller 138 does not adjust the position of boundary line 410, so that the delay budget=$N_R+N_L$ is constant. For example, if $N_R$ is initially selected so that buffer region corresponding to $N_R$ is 2 seconds and $N_L$ is selected so that the buffer region corresponding to $N_L$ is 0.5 seconds, then the delay budget is held constant at 2.5 seconds by delay controller 138. Delay controller 138 may still adjust the position of boundary line 405 within the delay budget, but the total value of the delay budget remains fixed at 2.5 seconds. In a dynamic mode, delay budget controller 138 may adjust the position of boundary line 410, so that the delay budget comprises $N_R$, $N_L$, and at least part of $\Delta N$. Delay budget controller 138 may also adjust the position of boundary line 405 in the dynamic mode.

Real-time QoS characterization circuit 505 continuously calculates and updates the characterization of Internet sessions in real-time using three network parameters: round-trip delay ($\delta_{rtt}(t)$), delay jitter ($\delta_{jit}(t)$), and bandwidth ($\beta(t)$). An exemplary network-based random process model $\aleph$ may then be derived based on a set of observations, $\Theta(t)=\{\delta_{jit}(t), \delta_{rtt}(t), \beta(t)\}$, using these three QoS parameters. Once calculated, real-time QoS characterization circuit 505 communicates the network QoS model set for a particular time t, $\aleph(t;\Theta)$, to other real-time processes in streaming video receiver 130:

$$\aleph(t;\Theta)=\{\delta_{jit}(t), \delta_{rtt}(t), \beta(t)\} \quad \text{[EQUATION 8]}$$

Although real-time QoS characterization circuit 505 primarily determines QoS characterization parameters, assistance with these calculations may occasionally be needed from streaming video transmitter 110.

Buffer management circuit 510 identifies internal and external delay times and manages the flow of data for ITD buffer 132. At the beginning of each streaming session, buffer management circuit 510 identifies two minimum delay parameters for buffering media streams. The delay parameters are the minimum ideal start-up delay, $\Delta_{su}$, and the minimum total start-up delay, $D_{su}$. The value $\Delta_{su}$ represents the minimum buffering delay needed to ensure that a multimedia video clip will not encounter an underflow condition during the streaming session (assuming no network delay jitter). Since $\Delta_{su}$ is a function of the particular media stream, its value can be communicated to buffer management circuit 510 by different means. For instance, $\Delta_{su}$ information may be carried in the media stream, as in the case with the MPEG-2 transport stream and PES layer time stamps.

Buffer management circuit 510 may identify or compute the value for $D_{su}$ in several ways. One criterion is that $D_{su}$ should always be larger than $\Delta_{su}$. In one embodiment, buffer management circuit 510 may obtain the value for $D_{su}$ from initialization data which may be modified by the user. In another embodiment, buffer management circuit 510 may access a programmable or user entered maximum start-up delay which can be substituted for $D_{su}$ or used as the basis for calculating $D_{su}$.

In another embodiment, buffer management circuit 510 may calculate preliminary estimates for the round-trip delay $\delta_{rtt}(t)$, delay jitter $\delta_{jit}(t)$, and the bandwidth $\beta(t)$, while ITD buffer 132 is storing streaming data during the initial ideal $\Delta_{su}$ period. Buffer management circuit 510 may then use these QoS parameters for calculating a desirable value for $D_{su}$ based on some criterion (e.g., pick a minimum $D_{su}$ value that enables decoder buffer 131 to recover lost packets with high probability of success). An exemplary buffer management circuit 510 computation for $D_{su}$ based on preliminary QoS characterization estimates is described below. Alternatively, buffer management circuit 510 may use a combination of user/application driven or network-condition driven applications, or other approaches, for computing $D_{su}$.

After $\Delta_{su}$ and $D_{su}$ have been identified, budget management circuit 510 calculates the minimum delay budget ($D_{budget}$), where $D_{budget}=D_{su}-\Delta_{su}$. The $D_{budget}$ represents the minimum amount of time available for detecting and recovering lost packets for the remainder of the data streaming session.

Once initialized and after receiving required time allocations for detecting and recovering lost packets, buffer management circuit 510 monitors ITD buffer 132 for the absence of expected packets. A minimum monitoring detection time ($\tau_{det}$) determines the time before a NACK is sent to streaming video transmitter 110. Buffer management circuit 510 may transfer from 1 to R NACKS for each temporal segment of "T" seconds, where R represents the number of access units present in T.

Delay-budget management circuit 515 determines and manages the elapsed time needed for detecting and for recovering lost packets through the re-transmission process. In one embodiment, delay-budget management circuit 515 accomplishes these responsibilities by allocating portions of the time calculated for a static $D_{budget}$ as packet loss detection time ($\tau_{det}$) and as packet re-transmission time ($\tau_{rtx}$) so that $D_{budget}=\tau_{det}+\tau_{rtx}$.

Delay-budget management circuit 515 takes into consideration the real-time network condition model $\aleph$ derived by real-time QoS characterization circuit 505:

$$\tau_{det}(t; \aleph)+\tau_{rtx}(t; \aleph)=D_{budget} \quad \text{[EQUATION 9]}$$

The above equation expresses the constraints that delay-budget management 515 circuit must adhere to when using a static value for $D_{budget}$. A generalization of this static approach to a time-varying (or dynamic) delay-budget framework is described below.

There are a number of ways of determining $\tau_{det}$ and $\tau_{rtx}$. In one embodiment of the present invention, during a session delay-budget management circuit 515 continuously adapts to changing network conditions by generating the current estimates of positive delay jitter $\Delta_{jit+}(t)$ and the round-trip delay $\Delta_{rtt}(t)$ using the set of observations $\Theta(t) = \{\delta_{jit}(t), \delta_{rtt}(t)\}$ that were collected in real time. Once estimates of $\Delta_{jit+}(t)$ and $\Delta_{rtt}(t)$ are determined, delay-budget management circuit 515 may scale these values to fit into the delay budget and assigns the scaled values to $\tau_{det}(t)$ and $\tau_{rtx}(t)$ as follows:

$$\tau_{rtx}(t) = [w_{rtt}(t)\Delta_{rtt}(t)/(w_{rtt}(t)\Delta_{rtt}(t) + w_{jit+}(t)\Delta_{jit+}(t))]D_{budget}$$

and $$\tau_{det}(t) = [w_{jit+}(t)\Delta_{jit+}(t)/(w_{rtt}(t)\Delta_{rtt}(t) + w_{jit+}(t)\Delta_{jit+}(t))]D_{budget}$$

For a given pair of estimates, $\Delta_{rtt}(t)$ and $\Delta_{jit+}(t)$, if the weighting factors $w_{rtt}(t)$ and $w_{jit+}(t)$ are equal, these formulas give equal weight to both the packet-loss detection process and the retransmission process. Therefore, the delay budget, $D_{budget}$, is utilized in a "fair" manner between the two processes. This is accomplished by keeping the ratio $\tau_{rtx}(t)/\tau_{det}(t)$ the same as $\Delta_{rtt}(t)/\Delta_{jit+}(t)$ for all times t.

Delay-budget management circuit 515 uses a packet-lost time allocation process that minimizes the time needed for declaring a packet lost, while providing enough time so that the probability that the packet is really lost is as high as possible. The latter criterion is important for minimizing the duplicate transfer of packets and increasing the effective available bandwidth over the Internet session under consideration.

Once the packet-lost time ($\tau_{det}$) has been allocated, delay-budget management circuit 515 allocates the remaining time of $D_{budget}$ as time for recovering the lost packet. Thus, the time allocated for detecting a lost packet is based on minimizing the time for detecting a lost packet, while maximizing the available time for recovering the lost packet. When successful, the lost packet is recovered prior to the time when it is needed by video decoder 134.

In some cases, streaming video receiver 130 is constrained to operate within a maximum start-up delay due, for example, to user/application requirements. In these cases, buffer management circuit 510 treats the determination of $D_{su}$ as trivial and only considers the minimum (ideal) start-up delay $\Delta_{su}$ in its calculations.

When buffer management circuit 510 is not constrained by a strict maximum start-up delay, it may limit the time for the start-up delay in order to improve, for example, the system response time to the user or to use system resources (e.g., memory) more efficiently. In one embodiment, buffer management circuit 510 estimates start-up delay using a probabilistic approach based on generating preliminary models for the QoS parameters. These preliminary models may be generated by buffer management circuit 510 during the initial (ideal) $\Delta_{su}$, with consideration given to prior knowledge or assumptions about the characteristics of the Internet session under consideration. In addition, buffer management circuit 510 bases its estimate for $D_{su}$ on a desirable success ratio for packet loss recovery and a desirable confidence level in accurately identifying packet-loss occurrences.

For this embodiment, $P_R$ represents the desirable probability for successfully recovering a lost packet (i.e., recovering the packet prior to the time it is needed by the decoder). Similarly, $P_L$ represents the probability that a packet has been lost. Based on the ITD buffer model introduced in U.S. patent application Ser. No. 09/365,463, buffer management 510 computes $D_{su}$ as follows:

$$D_{su} = P_{rtt}^{-1}(P_R) + P_{jit+}^{-1}(P_L) + \Delta_{su} \quad \text{[EQUATION 10]}$$

where $P_{rtt}(\delta)$ and $P_{jit+}(\delta)$ are the probability distribution functions of the round-trip delay and the positive delay-jitter parameters, respectively. $P_{rtt}^{-1}(\cdot)$ and $P_{jit+}^{-1}(\cdot)$ are the corresponding inverse functions for $P_{rtt}(\delta)$ and $P_{jit+}(\delta)$.

Using these probability functions, buffer management circuit 510 measures positive-jitter events only for packets arriving later than expected. Consequently, buffer management circuit 510 derives the positive-jitter density-function $p_{jit+}(\delta)$ by normalizing the overall jitter probability-density function:

$$p_{jit+}(\delta) = p_{jit}(\delta)/[1 - P_{jit}(0)] \quad \text{[EQUATION 11]}$$

For these calculations, buffer management circuit 510 assumes that $\delta_{rtt}$ represents the total time for recovering a lost packet or the time interval from when the packet is declared lost through the re-transmission time. Moreover, buffer management circuit 510 assumes that the positive delay-jitter as received from data network 120 represents the time needed for declaring a packet lost ($\delta_{jit+}(t)$).

As mentioned previously, delay-budget management circuit 515 ensures a high confidence level for determining the amount of time allocated for identification of lost packets in order to minimize the transfer of duplicate packets. This high confidence level is especially needed when the available bandwidth is virtually 100% occupied by the multimedia stream being transmitted.

However, in cases when the available bandwidth $\beta(t)$ is higher than the bitstream bit rate r(t), delay-budget management circuit 515 may utilize some of the excess bandwidth $[\beta(t) - r(t)]$ for increasing the probability of recovering lost packets. In these cases, delay-budget management circuit 515 may decrease the value for $\delta_{jit}(t)$ which may cause an increase of duplicate packet transmissions. When excess bandwidth is present, these duplicated packets will not compete with the primary bitstream. The extra time available for re-transmission of lost-packets may improve the overall packet-loss-recovery mechanism without causing a significant increase in the packet loss ratio.

In one embodiment, delay-budget management circuit 515 enhances the ability to calculate a minimum value for $\delta_{jit}$ across time t by considering the change in excess bandwidth across time and the desirable probability for successful recovery of a lost packet.

Delay-budget management circuit 515 determines that a packet is lost when the following equation is satisfied:

$$P_L = \int_0^{P_{jit+}^{-1}(P_L)} p_{jit+}(\delta; t) d\delta \quad \text{[EQUATION 12]}$$

where $P_L$, in this case, represents the probability that a packet has been lost when it is declared lost.

In other words, when the probability of a packet-loss event for a particular packet reaches $P_L$, delay-budget management circuit 515 declares the packet lost by the system. In a static implementation for $P_L$, delay-budget management circuit 515 simply sets $P_L$ to equal the desired static confidence level.

Delay-budget management circuit 515 modifies the value of $P_L$ in response to the network condition and to the characteristic of the stream bit rate. In one embodiment, delay-budget management circuit 515 quantifies the change of $P_L$ across time ($P_L(t)$) as follows:

$$P_L(t) = \int_0^{p_{jit^+}^{-1}(P_L(t))} p_{jit^+}(\delta;t)\,d\delta \propto \frac{r(t)}{\beta(t)} \quad \text{[EQUATION 13]}$$

Using this relationship, delay-budget management circuit 515 chooses a smaller $P_L$ as the trigger for a packet-loss declaration event when the available bandwidth is high.

As explained above, in the absence of any positive delay-jitter in the network, the delay-budget management circuit 515 may rely on the minimum delay $D_{budget}$ for packet loss recovery. This is due to the fact that the ideal decoding delay of the media stream can be as small as zero during any given session.

For example, the Integrated Transport Decoder (ITD) buffer model described in U.S. patent application Ser. No. 09/365,463 incorporates an ideal decoder section that can be drained even in the absence of network jitter or packet loss events. However, this ideal decoder section can include a delay $\Delta_{dec}(t)$ that varies in time and can be as large as the end-to-end encoder-decoder ideal buffering delay $\Delta$.

For the static embodiment of delay-budget management circuit 515, delay-budget management circuit 515 only focuses on and manages the re-transmission section of ITD buffer 132. This embodiment provides the means for simplifying ITD buffer 132 and the time-delay management process.

In another embodiment which incorporates a relatively small increase in complexity, streaming video receiver 130 uses a dynamic time-varying delay budget for its packet-loss recovery:

$$D(t) = D_{budget} + \Delta_{dec}(t) \quad \text{[EQUATION 14]}$$

where $D_{budget}$ is the same parameter as briefly described for the static embodiment of delay-budget management 515. One dynamic embodiment of delay-budget management circuit 515 continuously monitors the ideal-buffer section in order to estimate $\Delta_{dec}(t)$. Furthermore, the delay-budget constraint expressed in EQUATION 8 is modified as follows:

$$\tau_{det}(t; \aleph) + \tau_{rtx}(t; \aleph) = D(t) \quad \text{[EQUATION 15]}$$

where:

$$D_{budget} \leq D(t) \leq D_{budget} + \Delta \quad \text{[EQUATION 16]}$$

This dynamic framework can be further generalized to include multiple attempts for packet loss recovery. In this case, depending on the amount of delay available, buffer management circuit 510 can request n packet re-transmission times:

$$n(t)\tau_{det}(t; \aleph) + \tau_{rtx}(t; \aleph)] = D(t) \quad \text{[EQUATION 10]}$$

Therefore, as the occupancy of ITD buffer 132 changes, the buffer management circuit 510 can change n. This capability approaches the benefits achieved from the instantaneous delay $\Delta_{dec}(t)$ experienced in the ideal-buffer section of the ITD buffer model introduced in U.S. patent application Ser. No. 09/365,463.

Figure 6:
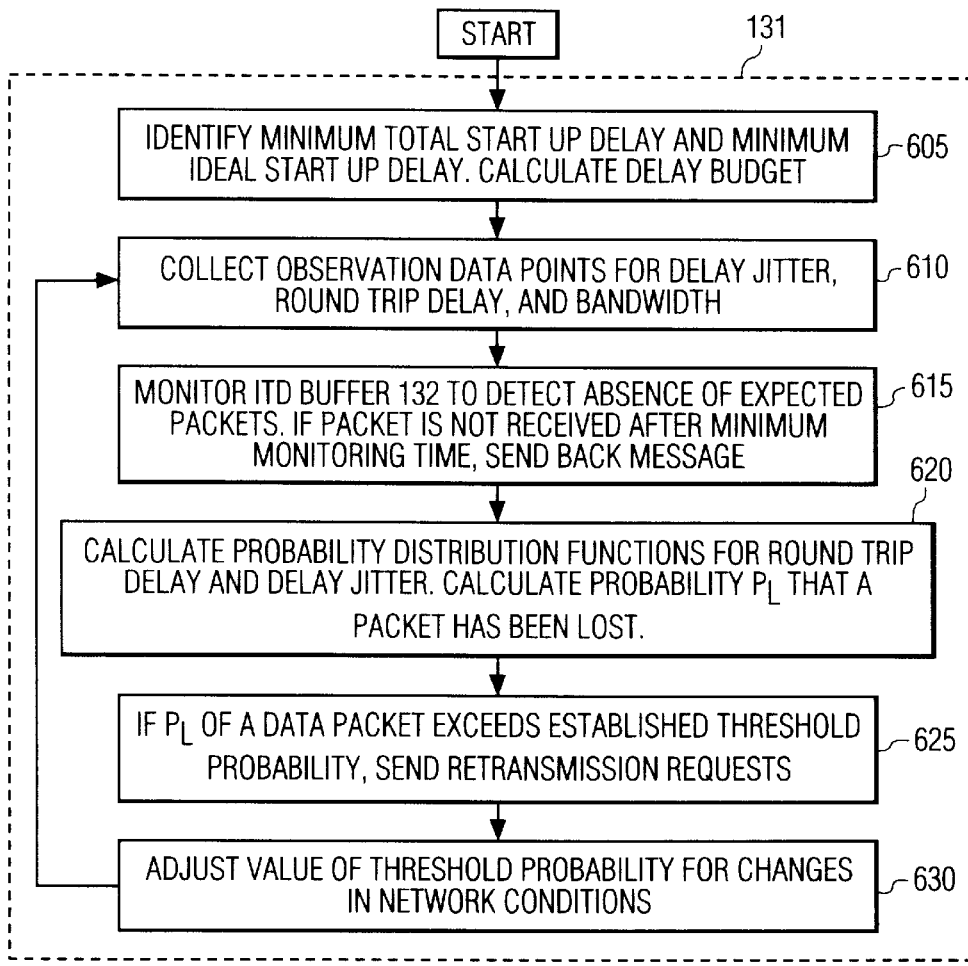
FIG. 6 is a flow chart illustrating the operation of an exemplary decoder buffer in accordance with one embodiment of the present invention.

FIG. 6 is a flow chart illustrating the operation of exemplary decoder buffer 131 in accordance with one embodiment of the present invention. Initially, delay budget management circuit 515 identifies a minimum total start-up delay ($D_{SU}$) and a minimum ideal start-up delay ($\Delta_{SU}$), and calculates a delay budget ($D_{BUDGET}$) (process step 605). Real-time QoS characterization circuit 505 monitors conditions on data network 120 and collects measured data for round-trip delay, $\delta_{rt}(t)$, delay jitter, $\delta_{jit}(t)$, and bandwidth, $\beta(t)$ (process step 610).

Delay budget controller. 138 monitors ITD buffer 132 to detect the absence of expected packets. If a packet is not received after a minimum monitoring time, it is determined to be lost and a NACK message is sent to streaming video transmitter 110 (process step 615). Using the statistics gathered by real-time QoS characterization circuit 505, delay budget controller 138 calculates the probability distribution functions for round trip delay and delay jitter. Delay budget controller 138 also calculates the probability that a video packet has actually been lost when it was declared lost (process step 620).

If the probability that a particular data packet has been lost exceeds an established probability threshold, delay budget controller 138 transmits a retransmission request to streaming video transmitter 110 (process step 625). Optionally, delay budget controller 138 may adjust the value of the established probability threshold in order to adapt to changing delay conditions on network 120 (process step 630).

Although the present invention has been described in detail, those skilled in the art should understand that they can make various changes, substitutions and alterations herein without departing from the spirit and scope of the invention in its broadest form.

What is claimed is:

1. For use with a decoder buffer capable of receiving streaming data packets over a data network from a streaming transmitter and storing said data packets in a plurality of access units for subsequent retrieval by a streaming data decoder, a delay budget controller comprising:

a first controller capable of monitoring at least one network parameter associated with said data network;

a second controller capable of monitoring in said decoder buffer a delay budget region comprising a sequence of access units that are to be accessed sequentially by said data decoder, said delay budget region comprising a retransmission region and a late region separated by a temporal boundary, wherein said second controller detects missing data packets in said retransmission region and said late region and, in response to detection of a missing data packet in said retransmission region, transmits a retransmission request for said missing data packet to said streaming transmitter, and wherein said second controller is capable of adjusting said temporal boundary to thereby advance or retard said transmission of said retransmission request.

2. The delay budget controller set forth in claim 1 wherein said second controller adjusts said temporal boundary in response to a measured value of said at least one network parameter.

3. The delay budget controller set forth in claim 2 wherein said at least one network parameter comprises a round trip delay period associated with said retransmission request.

4. The delay budget controller set forth in claim 3 wherein said at least one network parameter comprises a delay jitter associated with a variation in transmission delay from said streaming transmitter to said decoder buffer.

5. The delay budget controller set forth in claim 2 wherein said at least one network parameter comprises an available bandwidth value associated with a communication channel between said streaming data transmitter and said decoder buffer.

6. The delay budget controller set forth in claim 2 wherein said first and second controllers are capable of determining a probability that a packet that is identified as lost by said first and second controllers is actually lost.

7. The delay budget controller set forth in claim 6 wherein said second controller adjusts said temporal boundary in response to a value of said probability.

8. The delay budget controller set forth in claim 2 wherein said first controller is capable of adjusting a second temporal boundary associated with said delay budget region to thereby increase or decrease a duration of said delay budget region.

9. A video system comprising:
   a decoder buffer capable of receiving streaming video packets over a data network from a streaming video transmitter and storing said video packets in a plurality of access units for subsequent retrieval;
   a delay budget controller comprising:
      a first controller capable of monitoring at least one network parameter associated with said data network;
      a second controller capable of monitoring in said decoder buffer a delay budget region comprising a sequence of access units that are to be accessed sequentially, said delay budget region comprising a retransmission region and a late region separated by a temporal boundary, wherein said second controller detects missing video packets in said retransmission region and said late region and, in response to detection of a missing video packet in said retransmission region, transmits a retransmission request for said missing video packet to said streaming transmitter, and wherein said second controller is capable of adjusting said temporal boundary to thereby advance or retard said transmission of said retransmission request;
   a video decoder capable of retrieving said video packets from said decoder buffer and decoding said video packets; and
   a display device coupled to said video decoder for displaying said decoded video packets.

10. The video system set forth in claim 9 wherein said second controller adjusts said temporal boundary in response to a measured value of said at least one network parameter.

11. The video system set forth in claim 10 wherein said at least one network parameter comprises a round trip delay period associated with said retransmission request.

12. The video system set forth in claim 11 wherein said at least one network parameter comprises a delay jitter associated with a variation in transmission delay from said streaming transmitter to said decoder buffer.

13. The video system set forth in claim 10 wherein said at least one network parameter comprises an available bandwidth value associated with a communication channel between said streaming video transmitter and said decoder buffer.

14. The video system set forth in claim 10 wherein said first and second controllers are capable of determining a probability that a packet that is identified as lost by said first and second controllers is actually lost.

15. The video system set forth in claim 14 wherein said second controller adjusts said temporal boundary in response to a value of said probability.

16. The video system set forth in claim 10 wherein said first controller is capable of adjusting a second temporal boundary associated with said delay budget region to thereby increase or decrease a duration of said delay budget region.

17. For use with a decoder buffer capable of receiving streaming data packets over a data network from a streaming transmitter and storing the data packets in a plurality of access units for subsequent retrieval by a streaming data decoder, a method of controlling retransmission requests associated with lost ones of the data packets comprising the steps of:
   monitoring at least one network parameter associated with the data network;
   monitoring in the decoder buffer a delay budget region comprising a sequence of access units that are to be accessed sequentially by the data decoder, the delay budget region comprising a retransmission region and a late region separated by a temporal boundary;
   detecting missing data packets in the retransmission region and the late region;
   in response to detection of a missing data packet in the retransmission region, transmitting a retransmission request for the missing data packet to the streaming transmitter; and
   adjusting the temporal boundary to thereby advance or retard the transmission of the retransmission request.

18. The method set forth in claim 17 wherein the temporal boundary is adjusted in response to a measured value of the at least one network parameter.

19. The method set forth in claim 18 wherein the at least one network parameter comprises a round trip delay period associated with the retransmission request.

20. The method set forth in claim 19 wherein the at least one network parameter comprises a delay jitter associated with a variation in transmission delay from the streaming transmitter to the decoder buffer.

21. The method set forth in claim 18 wherein the at least one network parameter comprises an available bandwidth value associated with a communication channel between the streaming data transmitter and the decoder buffer.

22. The method set forth in claim 18 including the further step of determining a probability that a packet that is identified as lost is actually lost.

23. The method set forth in claim 22 wherein the step of adjusting the temporal boundary is in response to a value of the probability.

24. The method set forth in claim 18 including the further step of adjusting a second temporal boundary associated with the delay budget region to thereby increase or decrease a duration of the delay budget region.

25. For use with a decoder buffer capable of receiving streaming data packets over a data network from a streaming transmitter and storing the data packets in a plurality of access units for subsequent retrieval by a streaming data decoder, computer-executable instructions stored on a computer-readable storage medium for controlling retransmission requests associated with lost ones of the data packets comprising the steps of:
   monitoring at least one network parameter associated with the data network;
   monitoring in the decoder buffer a delay budget region comprising a sequence of access units that are to be accessed sequentially by the data decoder, the delay budget region comprising a retransmission region and a late region separated by a temporal boundary;
   detecting missing data packets in the retransmission region and the late region;
   in response to detection of a missing data packet in the retransmission region, transmitting a retransmission request for the missing data packet to the streaming transmitter; and adjusting the temporal boundary to thereby advance or retard the transmission of the retransmission request.

26. The computer-executable instructions stored on a computer-readable storage medium set forth in claim 25 wherein the temporal boundary is adjusted in response to a measured value of the at least one network parameter.

27. The computer-executable instructions stored on a computer-readable storage medium set forth in claim 26 wherein the at least one network parameter comprises a round trip delay period associated with the retransmission request.

28. The computer-executable instructions stored on a computer-readable storage medium set forth in claim 27 wherein the at least one network parameter comprises a delay jitter associated with a variation in transmission delay from the streaming transmitter to the decoder buffer.

29. The computer-executable instructions stored on a computer-readable storage medium set forth in claim 26 wherein the at least one network parameter comprises an available bandwidth value associated with a communication channel between the streaming data transmitter and the decoder buffer.

30. The computer-executable instructions stored on a computer-readable storage medium set forth in claim 26 including the further step of determining a probability that a packet that is identified as lost is actually lost.

31. The computer-executable instructions stored on a computer-readable storage medium set forth in claim 30 wherein the step of adjusting the temporal boundary is in response to a value of the probability.

32. The computer-executable instructions stored on a computer-readable storage medium set forth in claim 26 including the further step of adjusting a second temporal boundary associated with the delay budget region to thereby increase or decrease a duration of the delay budget region.

* * * * *